United States Patent
Lee

(10) Patent No.: US 9,408,014 B2
(45) Date of Patent: Aug. 2, 2016

(54) DATA TRANSMISSION METHOD FOR MACHINE TYPE COMMUNICATION (MTC) AND MTC APPARATUS

(71) Applicant: Electronics and Telecommunications Research Institute, Daejeon (KR)

(72) Inventor: Jun Hwan Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 13/869,237

(22) Filed: Apr. 24, 2013

(65) Prior Publication Data

US 2013/0294399 A1 Nov. 7, 2013

(30) Foreign Application Priority Data

Apr. 24, 2012 (KR) .................. 10-2012-0042784
Apr. 18, 2013 (KR) .................. 10-2013-0042598

(51) Int. Cl.
*H04W 4/00* (2009.01)
(52) U.S. Cl.
CPC .................. *H04W 4/005* (2013.01)

(58) Field of Classification Search
CPC .................................................. H04W 4/005
See application file for complete search history.

(56) References Cited

U.S. PATENT DOCUMENTS

| 7,551,546 | B2 | 6/2009 | Ma et al. |
| 2011/0194510 | A1* | 8/2011 | Gaal et al. ............ 370/329 |
| 2012/0020387 | A1 | 1/2012 | Arnott et al. |
| 2013/0121317 | A1* | 5/2013 | Lee et al. ............ 370/336 |

* cited by examiner

*Primary Examiner* — Jianye Wu
(74) *Attorney, Agent, or Firm* — Nelson Mullins Riley & Scarborough LLP

(57) ABSTRACT

A data transmission method for Machine Type Communication (MTC) and a MTC apparatus are disclosed. The data transmission method for MTC includes: dividing each of a plurality of subframes configured with time resources and frequency resources into a first region for transmitting control information and a second region for transmitting data; and allocating resources for MTC to the second region of each subframe according to a predetermined hopping period and a predetermined hopping frequency interval. Accordingly, it is possible to increase the data transfer rate of a MTC apparatus.

17 Claims, 9 Drawing Sheets

A : PCFICH + PHICH + PDCCH FOR LEGACY UEs
B : PDSCH FOR LEGACY UEs
C : MTC CONTROL SIGNALING AREA
D : MTC-PDSCH

A : PUSCH FOR LEGACY UEs
B : SOUNDING REFERENCE SIGNAL FOR LEGACY UEs
C : MTC DEMODULATION REFERENCE SIGNAL
D : MTC-PUSCH

DATA TRANSMISSION METHOD FOR MACHINE TYPE COMMUNICATION (MTC) AND MTC APPARATUS

CLAIM FOR PRIORITY

This application claims priority to Korean Patent Application No. 10-2012-0042784 filed on Apr. 24, 2012 and No. 10-2013-0042598 filed on Apr. 18, 2013 in the Korean Intellectual Property Office (KIPO), the entire contents of which are hereby incorporated by reference.

BACKGROUND

1. Technical Field

Example embodiments of the present invention relate in general to technology for machine type communication (MTC), and more specifically, to a data transmission method for MTC and an MTC apparatus, capable of increasing a data transmission capacity.

2. Related Art

Lately, Machine-to-Machine (M2M) communication that connects peripheral objects to each other through a network to enable users to easily acquire and transfer desired information at anytime and anywhere and to provide and use various services based on the acquired information is attracting a large amount of attention as a main issue for a next-generation communication market.

Conventionally, the M2M communication has been applied to sensors intended for local regions and to RFID networks; however, its use is extending to various wired/wireless networks along with diversity in purpose and characteristics of applications. Recently, interest in M2M communication based on a mobile communication network in consideration of mobility of machines, a widespread service region including islands, mountains, the field of ocean, etc., easiness of network management/maintenance/repair, security for reliable data transmission, quality of service (QoS), etc. is increasing.

The $3^{rd}$ Generation Partnership Project (3GPP) which is a representative European organization for establishing standards for a mobile communication system has been performing standardization of machine type communication (MTC) since 2008, starting from studies into the validity of M2M communication in 2005.

The 3GPP has defined a "machine" as an object requiring no direct manipulation or intervention by a human, and "MTC" as a data communication type in which one or more "machines" are included. That is, the MTC can be defined as a data communication type associated with one or more entities requiring no human's intervention.

The MTC differs from the current human-based optimized mobile network service in terms of a different market scenario, data communications, low costs and effort, a very large number of potential communication terminals included, little traffic generated per terminal, etc.

The MTC can be applied to various application fields. For example, the MTC can be applied to applications for security, tracking & tracing, payment, eHealth, remote maintenance & control, smart metering, consumer devices, and the like.

Meanwhile, in the MTC-related standardization which is presently performed by the 3GPP, a technology for low-price MTC terminals is attracting strong attention.

Defined requirements for the low-price MTC terminals based on Long Term Evolution (LTE) include a data transfer rate equal to or higher than 118.4 kbps (downlink) and 59.2 kbps (uplink), significantly improved frequency efficiency compared to Global System for Mobile Communication (GSM)/Enhanced General Packet Radio Service (EGPRS) terminals, a service coverage equal to or wider than that provided by a GSM/EGPRS MTC terminal, enabling legacy LTE terminals and LTE MTC terminals to be usable at the same frequency, reuse of a conventional LTE/System Architectual Evolution (SAE) network, optimization in a Time Division Duplex (TDD) as well as in a Frequency Division Duplex (FDD) mode, supporting limited mobility and low-power consumption modules, etc.

The 3GPP discusses, as physical layer specifications for satisfying the above requirements for the low-price MTC terminals, technologies for narrow-band supporting, a single RF chain, half duplex FDD, a long Discontinued Reception (DRX) period, modulation, Hybrid-Automatic Repeat request (H-ARQ), rate matching, handover, a new category type, etc.

Particularly, the 3GPP considers a bandwidth from 1.4 MHz to 5 MHz for technology related to use of a narrow-band frequency for implementing low-price MTC terminals. However, setting of such a narrow frequency band depends on fields to which MTC is applied.

Meanwhile, in the case in which MTC terminals use a fixed narrow frequency band, there are difficulties in obtaining frequency diversity gain, which leads to deterioration of transmission efficiency of MTC terminals.

Accordingly, a new data transmission method capable of solving the problem of MTC terminals using a narrow band is needed.

SUMMARY

Accordingly, example embodiments of the present invention are provided to substantially obviate one or more problems due to limitations and disadvantages of the related art.

An example embodiment of the present invention provides a data transmission method for Machine Type Communication (MTC), capable of increasing the data transmission capacity of MTC terminals using a narrow band.

In some example embodiments, a data transmission method for Machine Type Communication (MTC), which is performed by a communication apparatus supporting MTC includes: dividing each of a plurality of subframes configured with time resources and frequency resources into a first region for transmitting control information and a second region for transmitting data; and allocating resources for MTC to the second region of each subframe according to a predetermined hopping period and a predetermined hopping frequency interval.

Here, the resources for MTC may be configured with a frequency band that is narrower than the frequency band of each subframe and include a plurality of resource blocks, and the predetermined hopping frequency interval may be decided as a frequency interval corresponding to a minimum number of resource blocks included in the frequency band for MTC. Also, the center frequency of a resource for MTC allocated to the second region of a predetermined subframe among the plurality of subframes may be decided by a predetermined hopping frequency interval and a predetermined hopping index.

Also, the hopping index may be an integer equal to or greater than 0, and the maximum value of the hopping index may be decided by the number of resource blocks included in the plurality of subframes and the number of resource blocks allocated for MTC. Also, the hopping index may be shared by a transmitting apparatus and a receiving apparatus that perform MTC.

Here, the predetermined hopping period may be decided based on at least one value of the index of the subframe and the maximum value of the hopping index. Also, the predetermined hopping period may be decided as an integer multiple of the subframe.

Here, the allocating of the resources for MTC may include allocating the resources for MTC to a time region corresponding to the second region of each subframe, in consideration of a time difference between a frequency conversion delay time of a receiving apparatus for receiving MTC data and the time duration of the corresponding first region.

Here, the allocating of the resources for MTC may include allocating the resources for MTC to the same time duration as the second region if the frequency conversion delay time is equal to or shorter than the time duration of the first region.

Here, the allocating of the resources for MTC may include allocating the resources for MTC from a time point elapsed by the time difference between the frequency conversion delay time and the time duration of the first region from a time point at which the second region of the subframe starts, if the frequency conversion delay time is longer than the time duration of the first region and the hopping period corresponds to the length of a subframe. Also, the allocating of the resource for MTC may include first allocating resources for data transmission among the resources for MTC in a time domain.

Here, the allocating of the resource for MTC may include allocating the resources for MTC from a time point at which the second region of the subframe starts to a time point corresponding to the time difference between the frequency conversion delay time and the time duration of the first region, if the frequency conversion delay time is longer than the time duration of the first region and the hopping period corresponds to the length of a subframe. Also, the allocating of the resource for MTC may include first allocating resources for control information transmission among the resources for MTC in a time domain.

Here, in the allocating of the resource for MTC, the receiving apparatus for receiving the MTC data may start frequency conversion from a time point at which a region of the resources for MTC allocated to the second region of the subframe terminates.

In other example embodiments, a Machine Type Communication (MTC) apparatus includes: a digital-to-analog converter configured to convert a digital signal in a baseband frequency into an analog signal; a frequency up-converter configured to up-convert the center frequency of the analog signal provided from the digital-to-analog converter according to a predetermined hopping frequency interval; an amplifier configured to amplify a signal subjected to frequency up-conversion, provided from the frequency up-converter; and a duplexer configured to provide the amplified signal provided from the amplifier to an antenna.

Here, the hopping frequency interval may be set to a frequency interval corresponding to a minimum number of resource blocks included in a frequency band for MTC, and the frequency up-converter may up-convert the center frequency according to the hoping frequency interval and a hopping index.

Here, the MTC apparatus may further include: a low noise amplifier configured to amplify the signal provided from the duplexer; a frequency down-converter configured to down-convert the center frequency of the signal provided from the low noise amplifier into a baseband frequency according to a predetermined hopping frequency interval; and an analog-to-digital converter configured to convert the signal provided from the frequency down-converter into a digital signal.

According to the data transmission method for MTC and the MTC apparatus, resources for MTC using a narrow band are allocated by hopping the resources according to a predetermined hopping period and a predetermined frequency interval in the frequency domain for wide-band resources that is used by an existing communication system. Also, in the time domain of the wide-band resources, resources for MTC are allocated in consideration of a frequency conversion time according to frequency hopping.

Accordingly, it is possible to acquire frequency diversity gain in the frequency domain without adding processing load to a communication system, thereby increasing the data transfer rate of a MTC terminal.

Also, by allocating MTC resources in consideration of an RF tuning delay time according to frequency hopping, data loss that may occur due to hopping of frequency resources may be prevented in advance.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
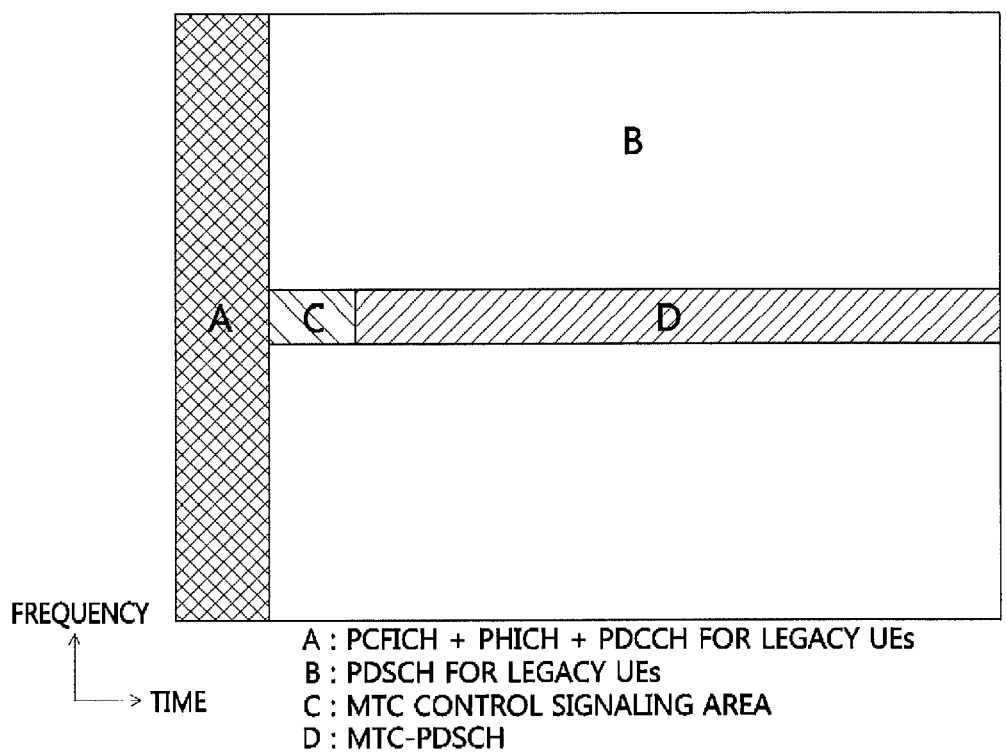
FIG. 1 illustrates an example of a downlink frame structure for supporting a narrow-band Machine Type Communication (MTC) terminal.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

FIG. 1 illustrates an example of a downlink frame structure for supporting a narrow-band Machine Type Communication (MTC) terminal.

FIG. 1 is a view for explaining an example of a downlink resource allocation method for a MTC terminal using a narrow band of 1.4 MHz in a Long Term Evolution (LTE) system using a frequency band of 20 MHz.

In a 3$^{rd}$ Generation Partnership Project (3GPP) LTE specification Release-8 or Release-9, a LTE terminal is defined to basically support frequency bands of 1.4, 3, 5, 10, 15, and 20 MHz. The reason in which the LTE terminal should support a plurality of extensible bandwidths is because base stations may support different bandwidths according to regions or carriers. If a LTE terminal supports a bandwidth of 20 MHz, the LTE terminal may receive data at a data transfer rate up to 150 Mbps upon 2×2 Multiple Input Multiple Output (MIMO) operation.

However, since the complexity and power consumption of a LTE terminal increase in proportion to a bandwidth which it has to support, the above-described structure is unsuitable for a MTC terminal requiring low-speed data and low power, and minimum data transmission speeds of 118.4 kbps (downlink) and 59.2 kbps (uplink), included in MTC requirements, can be sufficiently supported only by using the bandwidth of 1.4 MHz.

Meanwhile, even when a bandwidth that is used by MTC terminals is narrower than a bandwidth that is supported by a base station, the base station should be able to support MTC terminals as well as legacy LTE terminals in the same cell.

FIG. 1 illustrates an example of a downlink frame structure for simultaneously supporting legacy LTE terminals using a band of 20 MHz and MTC terminals using a narrow band of 1.4 MHz, wherein the downlink frame structure is configured with a 20 MHz band. In FIG. 1, the horizontal axis represents a time, and the vertical axis represents a frequency.

In FIG. 1, a region A is a region through which control information regarding legacy LTE terminals is transmitted, and a control channel, such as a Physical Control Format Indicator CHannel (PCFICH), a Physical Hybrid ARQ Indicator CHannel (PHICH), a Physical Downlink Control CHannel (PDCCH), etc., may be allocated.

A region B is a region through which data of the legacy LTE terminals is transmitted, and a data channel, such as a Physical Downlink Shared CHannel (PDSCH), etc., may be allocated.

Regions C and D are regions allocated for MTC. The region C is used to transmit control information regarding MTC terminals operating at a narrow band of 1.4 MHz, and a control channel for MTC may be allocated. The region D is used to transfer data of the MTC terminals operating at the same band, and a data channel for MTC, such as MTC-PDSCH, etc., may be allocated.

As illustrated in FIG. 1, MTC resources may simultaneously support LTE terminals and MTC terminals by allocating resources for narrow-band MTC terminals to a wide-band resource region prepared for a legacy LTE system.

Figure 2:
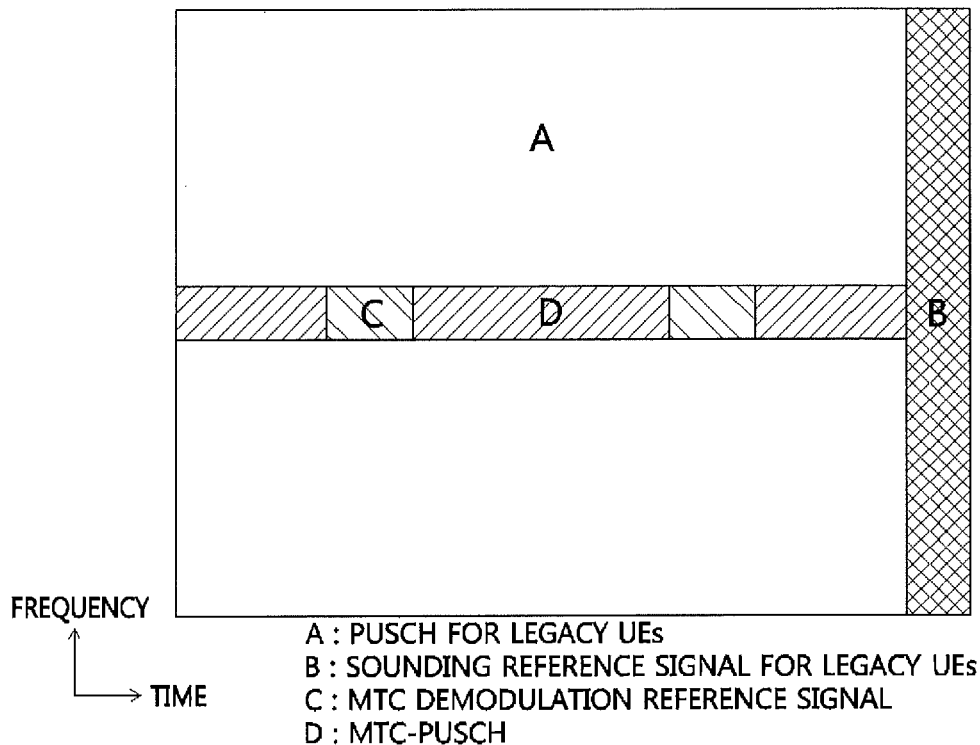
FIG. 2 illustrates an example of an uplink frame structure for supporting a narrow-band MTC terminal.

FIG. 2 illustrates an example of an uplink frame structure for supporting narrow-band MTC terminals.

FIG. 2 illustrates an example of an uplink frame structure for simultaneously supporting legacy LTE terminals using a band of 20 MHz and MTC terminals using a narrow band of 1.4 MHz, wherein the uplink frame structure is configured with a 20 MHz band. In FIG. 2, the horizontal axis represents a time, and the vertical axis represents a frequency.

In FIG. 2, a region A is a region through which uplink data of legacy LTE terminals is transmitted, and a data channel, such as a Physical Uplink Shared CHannel (PUSCH), etc., may be allocated.

A region B is a region through which a signal for estimating an uplink channel of legacy LTE terminals is transmitted, and a sounding reference signal, etc., may be allocated.

Regions C and D are allocated for uplink transmission of data and control information for MTC. The region C may be used to transmit uplink demodulation reference signals of MTC terminals operating at a narrow band of 1.4 MHz, and the region D may be used to transmit uplink data of the MTC terminals operating at the same band, and a MTC-PUSCH may be allocated.

As illustrated in FIG. 2, uplink resources for MTC terminals operating at a narrow band may be allocated through multiplexing with uplink resources of legacy LTE terminals operating at a wide band.

Generally, the characteristics of MTC traffics may be greatly classified into a type of transmitting data at a low data transfer rate at regular intervals to an uplink, a type of transmitting data based on events (event-driven) under the control of a base station, and a type of transmitting bulky data buffered during a specific time period, wherein the amount of data transmission through an uplink is larger than the amount of data transmission through a downlink.

Meanwhile, an environment to which MTC is applied generally shows more application cases in a fixed or low-speed mobile environment than in a high-speed mobile environment of MTC terminals.

Accordingly, as a method for increasing the data transmission capacity of MTC terminals, a method of using a plurality of antennas, like MIMO, can be considered; however, installing a plurality of antennas in each MTC terminal is not desirable in view of a low-cost requirement.

In order to overcome the problem, instead of installing a plurality of antennas in a MTC terminal, a method of increasing a data transmission capacity through diversity in a time or frequency domain can be considered. In a communication environment in which a MTC terminal is fixed or moves at a low speed, it is preferable to consider diversity gain in the frequency domain rather than in the time domain.

Meanwhile, in order to obtain diversity gain in the frequency domain, a base station scheduler has to recognize the channel states of individual MTC terminals located in a service region.

However, it is substantially difficult for the base station scheduler to recognize the radio channel states of all MTC terminals, and even though the base station scheduler has recognized the radio channel states of all MTC terminals, it will be a great load for the base station scheduler to perform adaptive scheduling on legacy LTE terminals and a large number of MTC terminals. Accordingly, a method for obtaining diversity gain while giving no additional load to an existing Medium Access Control (MAC) scheduler is needed.

Considering aforementioned conditions, the present invention acquires frequency diversity gain through hopping of frequency resources to MTC terminals to thereby increase the data transfer rate of MTC terminals. Also, the present invention allocates MTC resources to a time domain in consideration of an RF tuning delay time to thereby prevent data loss that may occur due to hopping of frequency resources in advance.

Hereinafter, a data transmission method for MTC according to an embodiment of the present invention will be described in more detail with reference to FIGS. 3 through 11.

Figure 3:
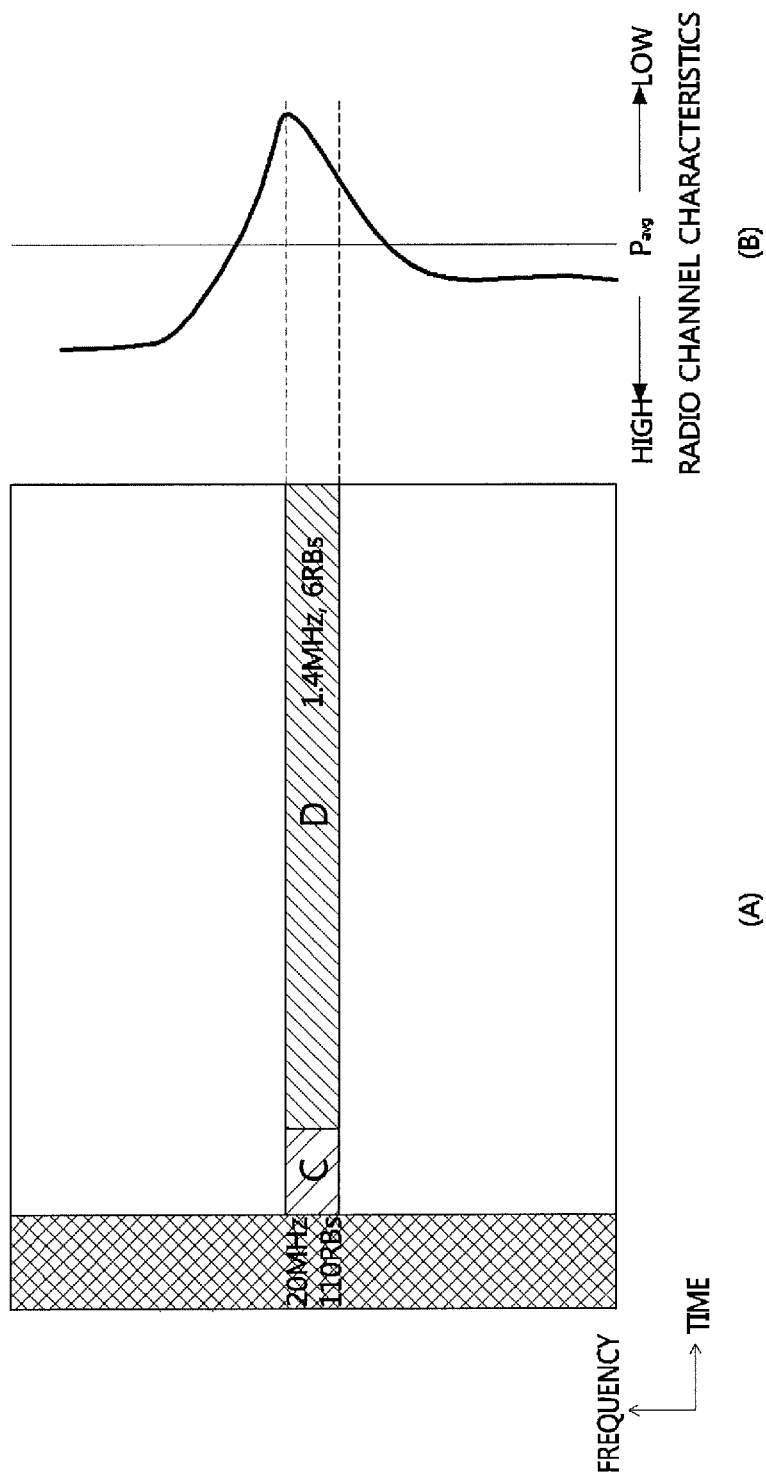
FIG. 3 is a conceptual view for explaining the characteristics of a radio channel environment in which a MTC terminal operates.

FIG. 3 is a conceptual view for explaining the characteristics of a radio channel environment in which a MTC terminal operates.

(a) of FIG. 3 shows radio resources allocated for MTC, in detail, an example of a frame structure for simultaneously supporting legacy LTE terminals using a wide band of 20 MHz and MTC terminals using a narrow band of 1.4 MHz.

In (a) of FIG. 3, regions C and D are regions allocated for MTC terminals. The region C is used to transmit control information regarding MTC terminals operating at the narrow band of 1.4 MHz, and the region D is used to transmit data of the MTC terminals operating at the same band.

Meanwhile, as illustrated in (b) of FIG. 3, if the radio channel characteristics of a frequency band allocated to MTC terminals fixed or moving at low speed are very poor, there may occur a problem in data transmission/reception of the MTC terminals. The packet transmission period of MTC terminals can be estimated according to an environment to which MTC has been applied; however, performance deterioration is inevitable if the MTC terminals have a transmission period of several tens of microseconds (msec) or more.

Also, if an error is generated in data transmitted by a MTC terminal, the error data can be recovered through an existing retransmission method. However, since it is substantially difficult to process retransmissions from a large number of MTC terminals, a method for dealing with a poor radio channel independently from retransmission is needed.

The present invention provides a method capable of improving the data transmission performance of MTC terminals even in a radio channel environment as illustrated in FIG. 3.

Figure 4:
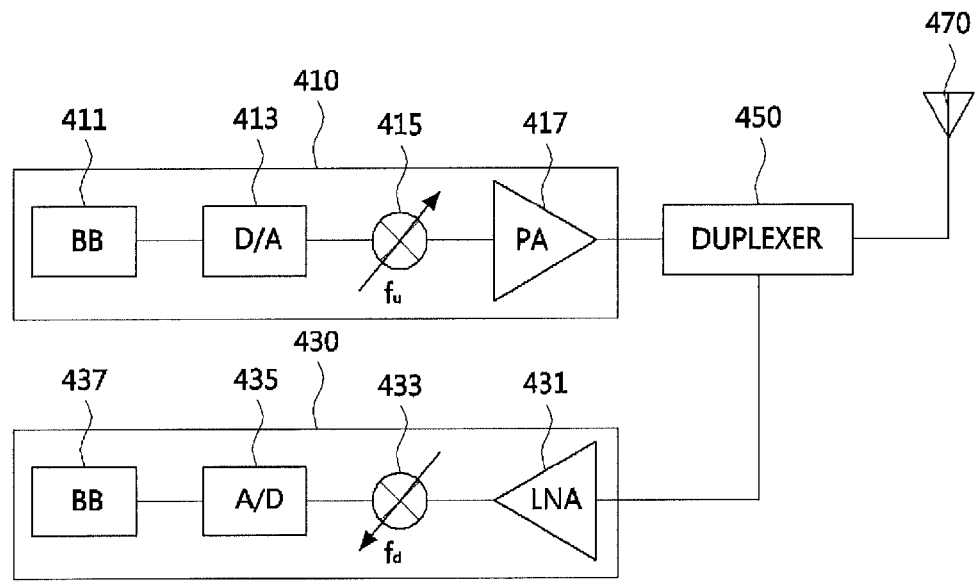
FIG. 4 is a block diagram schematically illustrating the configuration of a MTC terminal according to an embodiment of the present invention.

FIG. 4 is a block diagram schematically illustrating the configuration of a MTC terminal according to an embodiment of the present invention, and shows components for transmission of uplink and downlink signals in the MTC terminal.

Referring to FIG. 4, the MTC terminal may include a transmitter 410 that performs processing for transmitting signals through an uplink, and a receiver 430 that receives signals through a downlink and processes the received signals.

The transmitter 410 and the receiver 430 may transmit or receive signals using a single antenna 470, and accordingly, the transmitter 410 and the receiver 430 share the antenna 470 through a duplexer 450. That is, the duplexer 450 functions to separate signals between the antenna 470, the transmitter 410, and the receiver 430.

The transmitter 410 may include a baseband processor 411, a digital-to-analog converter 413, a frequency up-converter 415, and an amplifier 417.

The baseband processor 411 processes a low frequency band of data and provides the processed data to the digital-to-analog converter 413. The digital-to-analog converter 413 converts digital data into an analog signal and provides the analog signal to the frequency up-converter 415.

The frequency up-converter 415 mixes the low frequency band of signal provided from the digital-to-analog converter 413 with an uplink reference signal $f_u$ of a high frequency band provided from a local oscillator, etc. to up-convert the frequency of the analog signal into a RF band.

The amplifier 417 amplifies the analog signal having the frequency up-converted into the RF band such that the analog signal can be transmitted through the antenna 470, and then provides the amplified signal to the duplexer 450.

The receiver 430 may include a low noise amplifier (LNA) 431, a frequency down-converter 433, an analog-to-digital converter 435, and a baseband processor 437.

The low noise amplifier 431 receives a weak signal from the antenna 470 through the duplexer 450, amplifies the weak signal, and then provides the amplified signal to the frequency down-converter 433.

The frequency down-converter 433 mixes the analog signal provided from the low noise amplifier 431 with a downlink reference signal $f_d$ of an RF band to down-convert the analog signal of the RF band into a baseband frequency.

The analog-to-digital converter 435 converts the analog signal having the frequency down-converted into the baseband frequency into digital data and provides the digital data to the baseband processor 437. The baseband processor 437 processes the digital data provided from the analog-to-digital converter 435.

A data transmission method for MTC according to an embodiment adopts frequency hopping technology in order to prevent the data transmission/reception error of MTC terminals due to the frequency selective characteristics as illustrated in FIG. 3.

In detail, the present invention applies the uplink reference signal $f_u$ and the downlink reference signal $f_d$ input to the frequency up-converter 415 and the frequency down-converter 433, respectively, as defined in Equation (1), to hop frequency resources for MTC.

$$f_u = f_u^{base} + i \cdot \Delta f$$

$$f_d = f_d^{base} + i \cdot \Delta f \tag{1}$$

In Equation (1), $f_u^{base}$ represents a center frequency for frequency up-conversion, and $f_d^{base}$ represents a center frequency for frequency down-conversion. Also, i represents a hopping index which is an integer, and $\Delta f$ represents a frequency offset or a frequency interval which is a basic unit of hopping.

Meanwhile, a frequency hopping interval may be decided as the minimum number of resource blocks (RBs) that can be included in a frequency band allocated for MTC. For example, if a MTC terminal uses a frequency band of 1.4 MHz and the frequency band of 1.4 MHz is configured with a total of 6 RBs, frequency hopping is performed in a unit of minimally 6 RBs under an assumption that resources to be hopped do not overlap each other. Also, if a resource block is configured with 12 subcarriers, and the interval between the subcarriers is 15 kHz, the 6 RBs have a frequency interval of 1.08 MHz since each resource block has a band of 180 kHz, and the frequency interval of 1.08 MHz becomes the hopping frequency interval.

The hopping index i may have a value from 0 to $i_{max}-1$, and the value $i_{max}$ may be determined by Equation (2) below. Also, i may be shared between a base station and a MTC terminal trying to access a specific cell managed by the base station, and may be in the form of a table.

$$i_{max} = \left\lfloor \frac{N_{sys}^{RB}}{N_{MTC}^{RB}} \right\rfloor \quad (2)$$

In Equation (2), $N_{sys}^{RB}$ represents the number of RBs included in an entire system band, and $N_{MTC}^{RB}$ represents the number of RBs allocated to a MTC terminal.

Figure 5:
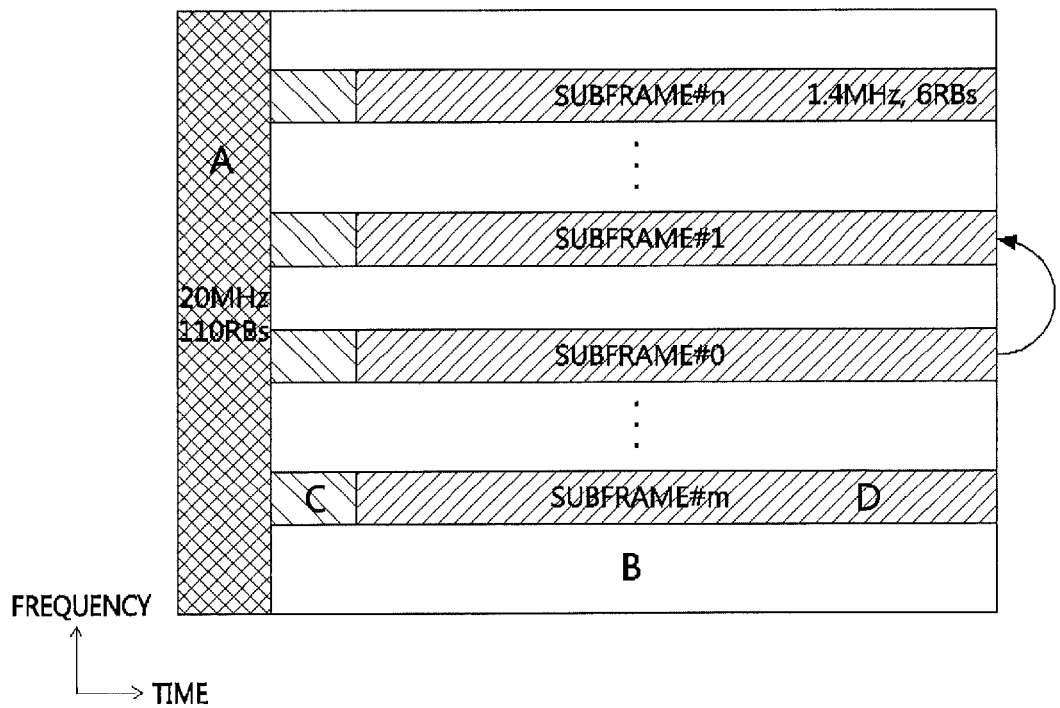
FIG. 5 is a conceptual view for explaining a frequency hopping method in a data transmission method for MTC according to an embodiment of the present invention.

FIG. 5 is a conceptual view for explaining a frequency hopping method in a data transmission method for MTC according to an embodiment of the present invention, and corresponds to an example of frequency hopping applied when a band of 1.4 MHz is allocated as a MTC resource to a LTE system band of 20 MHz.

Referring to FIG. 5, radio resources may be greatly divided into a region A that is used to transmit control information in an LTE system and a region B that is used to transmit data of the LTE system, and regions C and D to which radio resources for MTC are allocated are multiplexed with and allocated to the region B that is used to transmit data in the LTE system.

As illustrated in FIG. 5, if a system band of 20 MHz is configured with 110 RBs and a band of 1.4 MHz allocated for MTC is configured with 6 RBs, a frequency resource of 1.4 MHz for MTC may be hopped at a frequency interval corresponding to 6 RBs which is a minimum unit of RBs.

That is, in the example of FIG. 5, the interval between a subframe #0 and a subframe #1 which are radio resources allocated for MTC may be a frequency interval corresponding to 6 RBs.

Meanwhile, the data transmission method for MTC according to the current embodiment may decide a hopping period in consideration of the indexes of subframes and the maximum value $i_{max}$ of the hopping index i, and the hopping period may be decided as an integer multiple of a subframe.

Figure 6:
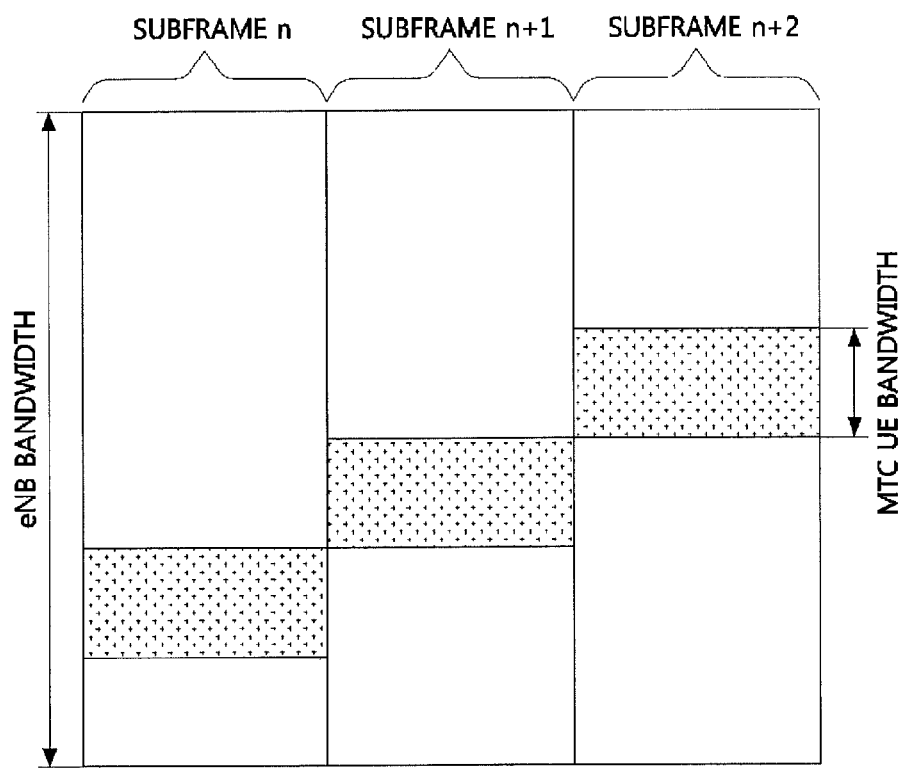
FIG. 6 illustrates a hopping pattern of a MTC resource, according to an embodiment of the present invention.

FIG. 6 illustrates a hopping pattern of MTC resources, according to an embodiment of the present invention, and shows an example of a hopping pattern when a hopping period is 1.

Referring to FIG. 6, if a hopping period is 1, frequency hopping for MTC resources is performed every subframe, and accordingly, a resource for MTC may be hopped such that its center frequency increases by a predetermined frequency interval (for example, a band of a MTC terminal) whenever the index n of a subframe increases with respect to successive subframes n, n+1, and n+2.

For example, if a frequency band allocated to a MTC terminal is 1.4 MHz and configured with 6 RBs, a resource for the MTC terminal may be allocated by increasing its frequency band by a frequency band corresponding to 6 RBs whenever the index of a subframe increases.

Meanwhile, as described above, when signals are transmitted and received by allocating resources to MTC terminals through frequency hopping, a MTC terminal or a base station receiving a signal whose frequency has been hopped has to tune the frequency of its RF device to the frequency hopped according to a hopping period, and accordingly, demodulation is impossible if an RF tuning delay time is not considered, which may result in data loss.

A time taken for an RF device to tune a frequency is about 300 us although the tuning time is more or less different according to implementation technology of the RF device. Although the frequency tuning time of an RF device can be shortened according to development of device implementation technology, the frequency tuning time cannot be negligible considering the fact that the length of an Orthogonal Frequency Division Multiplexing (OFDM) symbol defined in the LTE specification is shorter than 70 us.

Accordingly, the present invention allocates resources to MTC terminals in consideration of a frequency hopping period and an RF tuning delay time $T_{RF\_Tuning}$ of the MTC terminals.

Figure 7:
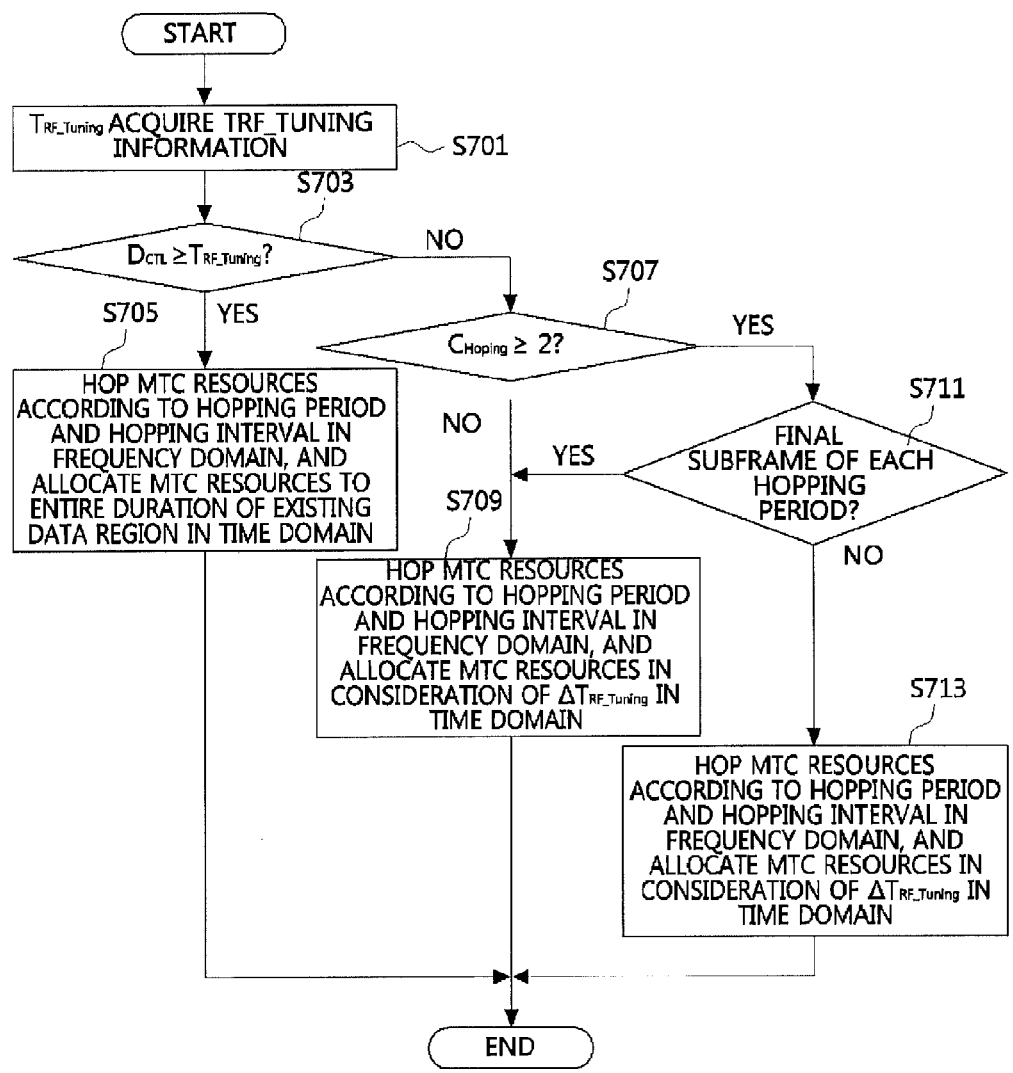
FIG. 7 is a flowchart illustrating a data transmission method for MTC according to an embodiment of the present invention.

FIG. 7 is a flowchart illustrating a data transmission method for MTC according to an embodiment of the present invention, and the data transmission method may be performed by a communication apparatus (for example, a base station) that allocates resources to MTC terminals. Hereinafter, for convenience of description, the communication apparatus for performing the data transmission method illustrated in FIG. 7 is indicated as a resource allocation apparatus.

Referring to FIG. 7, the resource allocation apparatus acquires information about the RF tuning delay time $T_{RF\_Tuning}$ of an apparatus of performing RF tuning (S701). Here, the apparatus of performing RF tuning is a communication apparatus of receiving a frequency-hopped signal for MTC, and for example, the communication apparatus may be a base station, a relay, a MTC terminal, etc. The RF tuning delay time $T_{RF\_Tuning}$ may be acquired by measuring the specification information or RF tuning delay time of an RF device that performs frequency conversion in correspondence to frequency hopping.

Thereafter, the resource allocation apparatus compares the RF tuning delay time $T_{RF\_Tuning}$ to a control information transmission duration $D_{CTL}$ to determine whether the RF tuning delay time $T_{RF\_Tuning}$ is equal to or shorter than the control information transmission duration $D_{CTL}$ (S703). Here, the control information transmission duration $D_{CTL}$ is a time duration of a region in which control information is transmitted in a resource of an existing communication system (for example, a LTE system).

If it is determined in operation S703 that the RF tuning delay time $T_{RF\_Tuning}$ is equal to or shorter than the control information transmission duration $D_{CTL}$, the resource allocation apparatus may allocate resources for the MTC terminal by hopping the resources according to a predetermined frequency interval and a predetermined hopping period in the frequency domain, and may allocate, in the time domain, resources for the MTC terminal to a length corresponding to the time length of a data transmission region of an existing communication system (S705). For example, resources for MTC in the time domain may be allocated to the same length as the time length of the data transmission region of an LTE system.

Here, the hoping period may be set to an integer multiple of a subframe, and a frequency to be hopped may be decided using Equation (1). Also, the hopping frequency interval $\Delta f$ may be decided as a frequency interval corresponding to a predetermined number of RBs. For example, if a MTC terminal uses a frequency band of 1.4 MHz and configured with 6 RBs, the frequency interval Δf may be set to a frequency interval corresponding to 6 RBs.

If the RF tuning delay time $T_{RF\_Tuning}$ is equal to or shorter than the control information transmission duration $D_{CTL}$, since the MTC terminal has already completed frequency conversion when the MTC terminal receives a control channel or a data channel allocated to itself, the MTC terminal can demodulate the allocated signal. Accordingly, resources for MTC are allocated to a region between a time point at which a data transmission period (or, a data channel allocation period) starts and a time point at which the data transmission period terminates (that is, a time point at which an MTC control region of the subframe starts) in each subframe of an existing communication system. Here, the resources for MTC may be divided into a region in which control information is transmitted, and a region in which data is transmitted, wherein the region in which control information is transmitted may be first allocated in the time domain, and then the region in which data is transmitted may be allocated. However, it is also possible that the region in which data is transmitted is first allocated in the time domain, and then the region in which control information is transmitted is allocated.

Referring again to FIG. 7, if it is determined in operation S703 that the RF tuning delay time $T_{RF\_Tuning}$ is longer than the control information transmission duration $D_{CTL}$, the resource allocation apparatus determines whether a hopping period $C_{Hopping}$ is equal to or greater than 2 (S707). Here, the hopping period $C_{Hopping}$ may be set to an integer multiple of a subframe.

If it is determined in operation S707 that the hopping period $C_{Hopping}$ is smaller than 2, this means that the hopping period $C_{Hopping}$ is equal to the length of a subframe. Accordingly, the resource allocation apparatus allocates MTC resources to a data transmission region in each subframe of an existing communication system for every subframe, in consideration of the time difference $\Delta T_{RF\_Tuning}$ between the RF tuning delay time $T_{RF\_Tuning}$ and the control information transmission duration $D_{CTL}$.

For example, if the RF tuning delay time $T_{RF\_Tuning}$ is longer than the control information transmission duration $D_{CTL}$ and the hopping period $C_{Hopping}$ is smaller than 2, the resource allocation apparatus allocates MTC resources from a time point at which a region for data transmission of an existing system starts in each subframe in such a manner to first allocate the region for data transmission in the MTC resources and then allocate a region for control information transmission. In this case, since RF tuning has not yet terminated at a time point at which the MTC data is received, MTC data received during the RF tuning delay time $T_{RF\_Tuning}$ may be lost.

In order to prevent such data loss, the resource allocation apparatus allocates, if the RF tuning delay time $T_{RF\_Tuning}$ is longer than the control information transmission duration $D_{CTL}$ and a hopping period is smaller than 2, MTC resources after a time has elapsed by the time difference $\Delta T_{RF\_Tuning}$ from a time point at which the data region of each subframe starts, in such a manner to first allocate resources for data transmission among the MTC resources and then allocate resources for control information transmission. If MTC resources are allocated in this way, the number of OFDM symbols that can be allocated to a duration corresponding to the time difference $\Delta T_{RF\_Tuning}$ is reduced, which may generate spectrum loss, but cause no problem in data reception.

Or, if the RF tuning delay time $T_{RF\_Tuning}$ is longer than the control information transmission duration $D_{CTL}$ and the hopping period $C_{Hopping}$ is smaller than 2, MTC resources are allocated from a time point at which the data region of each subframe starts in such a manner to allocate resources in the order of a MTC control information region and a MTC data region, wherein the MTC data region is allocated up to a region that is earlier by the time difference $\Delta T_{RF\_Tuning}$ than a time point at which the next subframe starts. Then, in the second hopping period, frequency conversion starts at a time point (that is, a time point at which the data transmission region of the first subframe terminates) that is earlier by the time difference $\Delta T_{RF\_Tuning}$ than the boundary between two subframes. That is, according to the data transmission method, by starting frequency conversion at a time point that is earlier by the time difference $\Delta T_{RF\_Tuning}$ than a time point at which each subframe starts in consideration of the RF tuning delay time $T_{RF\_Tuning}$, frequency conversion is completed before the MTC control region of the subframe starts, thereby overcoming a problem that a MTC control signal cannot be demodulated due to RF tuning delay.

Referring again to FIG. 7, if it is determined in operation S707 that the hopping period $C_{Hopping}$ is equal to or greater than 2, the resource allocation apparatus determines the locations of subframes to which MTC resources will be allocated for each hopping period configured with a plurality of subframes (S711), and applies operation S705 to subframes located before the final subframe of each hopping period to allocate resources for MTC terminals by hopping the resources in the frequency domain according to a predetermined frequency interval and a predetermined hopping period, and to allocate, in the time domain, resources to a length corresponding to the time length of the data transmission region of an existing communication system in each subframe (S713).

Meanwhile, if it is determined in operation S711 that a target subframe to be allocated corresponds to the final subframe of each hopping period, the resource allocation apparatus applies operation S709 to allocate MTC resources in consideration of the time difference $\Delta T_{RF\_Tuning}$ between the RF tuning delay time $T_{RF\_Tuning}$ and the control information transmission duration $D_{CTL}$.

For example, if a hopping period is configured in a unit of two subframes, two successive subframes included in a hopping period do not need to be subject to frequency conversion, and accordingly, the first subframe is allocated a MTC resource having the same time length as the data transmission region of an existing communication system. However, in the case of the second subframe corresponding to the final subframe of the two subframes configuring the hopping period and the first subframe configuring the next hopping period, an RF tuning delay time due to frequency conversion has to be considered since the center frequencies of MTC resources change according to a predetermined frequency interval. Accordingly, the second subframe is allocated MTC resources from a time point at which a data region starts, as described above in operation S709, by allocating resources in the order of MTC control information and MTC data, wherein resources for MTC data are allocated up to a time point that is earlier by the time difference $\Delta T_{RF\_Tuning}$ than the subframe boundary, and frequency conversion starts from a time point that is earlier by the time difference $\Delta T_{RF\_Tuning}$ than each subframe boundary.

Figure 8:
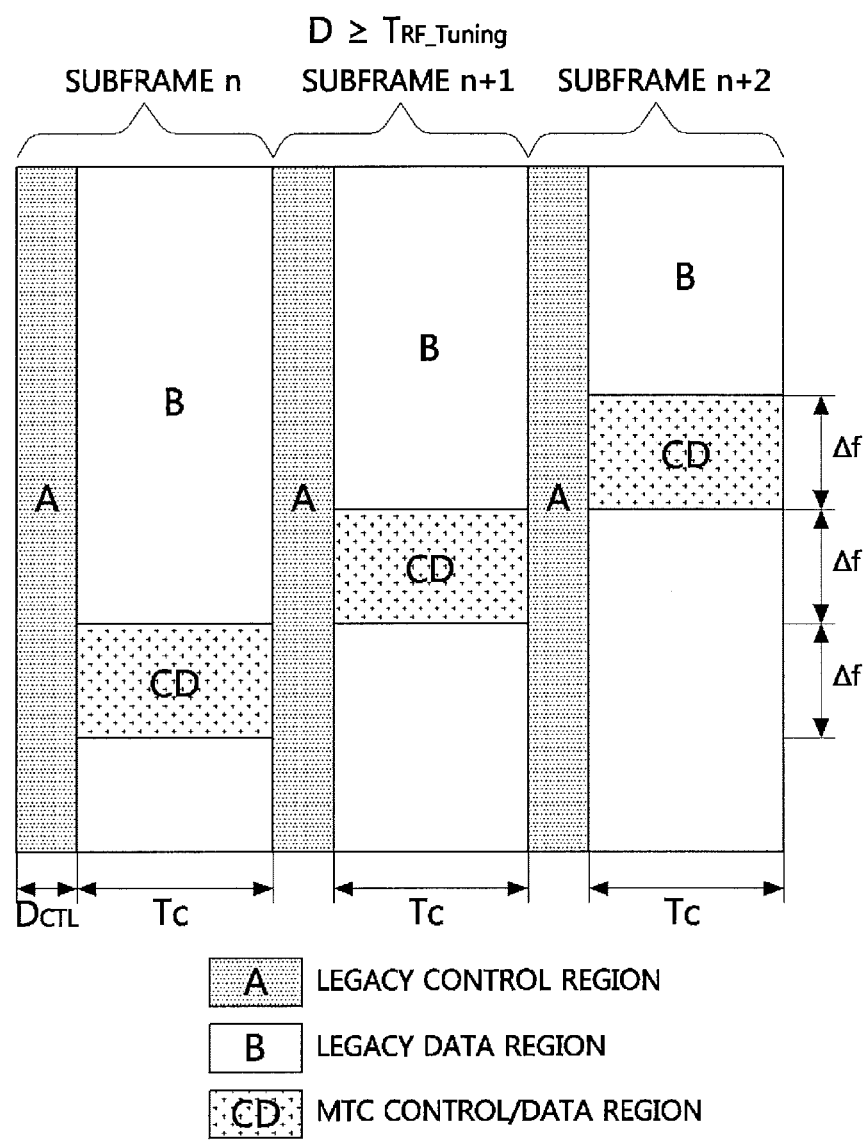
FIG. 8 is a conceptual view for explaining a data transmission method for MTC according to an embodiment of the present invention.

FIG. 8 is a conceptual view for explaining a data transmission method for MTC according to an embodiment of the present invention.

In detail, FIG. 8 is a view for explaining an example of a resource allocation method for MTC when an RF tuning delay time $T_{RF\_Tuning}$ is equal to or shorter than a control information transmission duration $D_{CTL}$ in the case in which a hopping period is 1 (that is, the length of a subframe) and a hopping frequency interval is set in a minimum unit of RBs.

As shown in FIG. 8, if the RF tuning delay time $T_{RF\_Tuning}$ is equal to or shorter than the control information transmission duration $D_{CTL}$, frequency conversion has already been completed at a time point at which a MTC terminal receives control and data channels allocated to itself so that the MTC terminal can demodulate the allocated signals. Accordingly, resources for the MTC terminal are allocated by hopping the resources by a predetermined frequency interval Δf, and in the time domain of each subframe, a MTC resource CD is allocated to the same length as the time length $T_c$ of the data transmission region B of an existing communication system.

Figure 9:
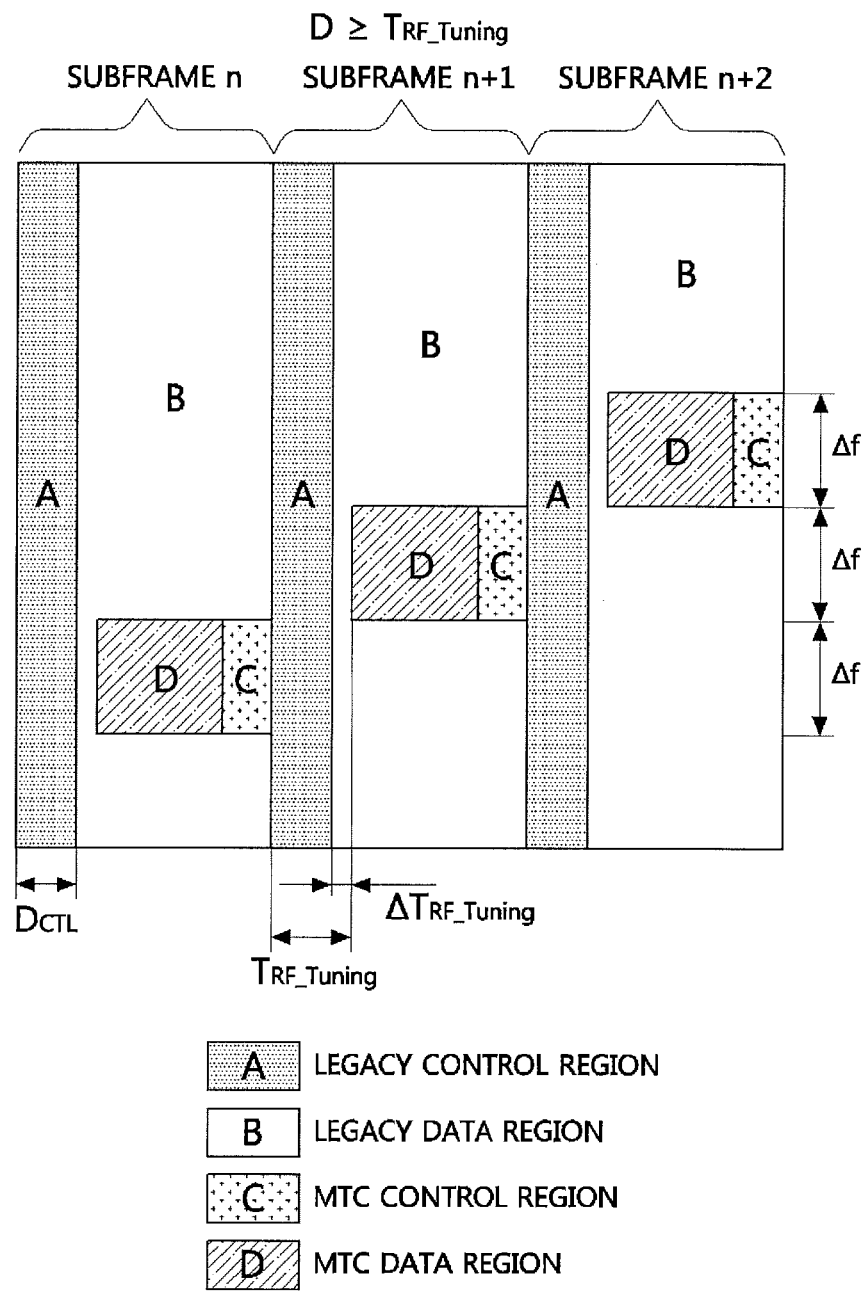
FIG. 9 is a conceptual view for explaining a data transmission method for MTC according to another embodiment of the present invention.

FIG. 9 is a conceptual view for explaining a data transmission method for MTC according to another embodiment of the present invention.

FIG. 9 is a view for explaining an example of a resource allocation method for MTC when an RF tuning delay time $T_{RF\_Tuning}$ is longer than a control information transmission duration $D_{CTL}$ in the case in which a hopping period is 1 (that is, the length of a subframe) and a hopping frequency interval is set in a minimum unit of RBs.

If the RF tuning delay time $T_{RF\_Tuning}$ is longer than the control information transmission duration $D_{CTL}$, as illustrated in FIG. 9, frequency resources are allocated by hopping the frequencies by a predetermined frequency interval Δf according to an increase of indexes of subframes.

Also, in the time domain, MTC resources are allocated after a time has elapsed by a time difference $\Delta T_{RF\_Tuning}$ from a time point at which the data region B of each subframe starts, in such a manner to first allocate a resource D for data transmission among the MTC resources and then allocate a resource C for control information transmission. If MTC resources are allocated in this way, the number of OFDM symbols that can be allocated to a duration corresponding to the time difference $\Delta T_{RF\_Tuning}$ is reduced, which may generate spectrum loss, but cause no problem in data reception.

Figure 10:
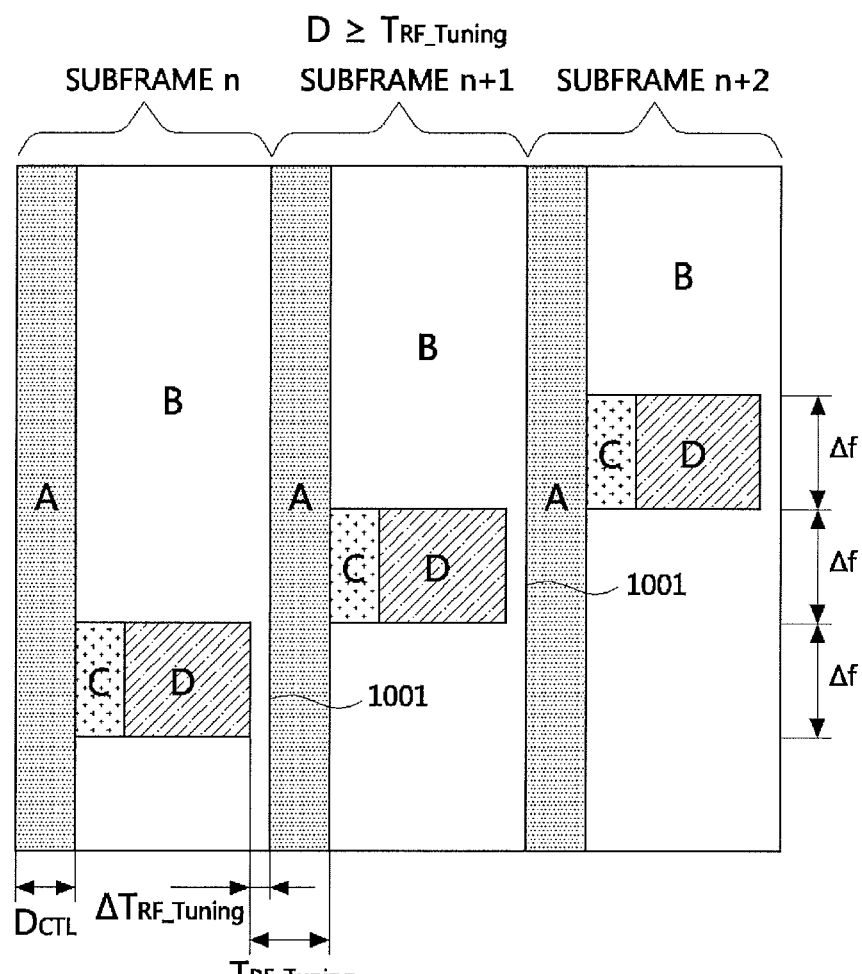
FIG. 10 is a conceptual view for explaining a data transmission method for MTC according to another embodiment of the present invention.

FIG. 10 is a conceptual view for explaining a data transmission method for MTC according to another embodiment of the present invention.

FIG. 10 is a view for explaining another example of a resource allocation method for MTC when an RF tuning delay time $T_{RF\_Tuning}$ is longer than a control information transmission duration $D_{CTL}$ in the case in which a hopping period is 1 (that is, the length of a subframe) and a hopping frequency interval is set in a unit of minimum RBs.

Referring to FIG. 10, if the RF tuning delay time $T_{RF\_Tuning}$ is longer than the control information transmission duration $D_{CTL}$, in the frequency domain, frequency resources are allocated by hopping the frequencies by a predetermined frequency interval Δf according to an increase of indexes of subframes, and in the time domain, MTC resources are allocated from a time point at which the data region B of each subframe starts in such a manner to allocate the MTC resources in the order of a region C for MTC control information and a region D for MTC data, wherein the resources for MTC data are allocated up to a time point that is earlier by a time difference $\Delta T_{RF\_Tuning}$ from a boundary 1001 at which the index of the corresponding subframe changes.

In the case of allocating MTC resources as illustrated in FIG. 10, in the second subframe (that is, the subframe n+1), processing for frequency conversion starts at a time point that is earlier by the time difference $\Delta T_{RF\_Tuning}$ than the boundary 1001 of the subframe.

That is, by starting frequency conversion at a time point that is earlier by the time difference $\Delta T_{RF\_Tuning}$ than a time point corresponding to the boundary of each subframe in consideration of an RF tuning delay time $T_{RF\_Tuning}$, the frequency conversion is completed when or before demodulation of a control region terminates in the subframe.

Figure 11:
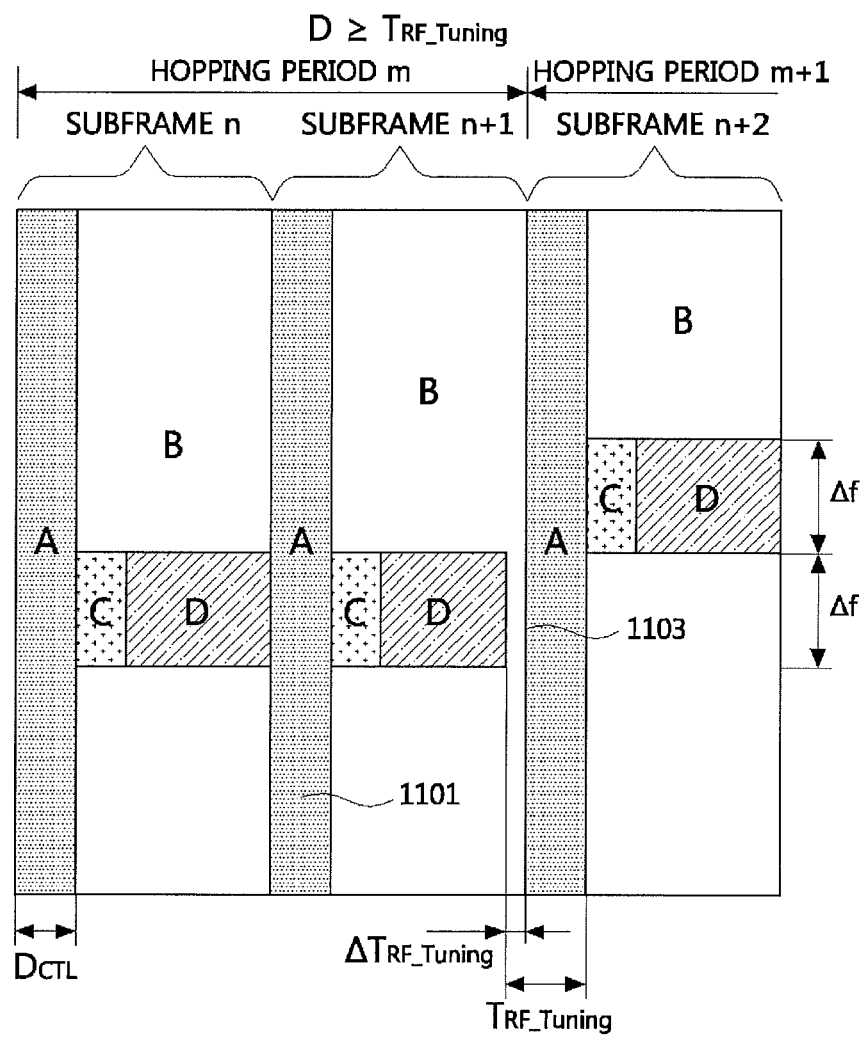
FIG. 11 is a conceptual view for explaining a data transmission method for MTC according to another embodiment of the present invention.

FIG. 11 is a conceptual view for explaining a data transmission method for MTC according to another embodiment of the present invention.

FIG. 11 is a view for explaining an example of a resource allocation method when an RF tuning delay time $T_{RF\_Tuning}$ is longer than a control information transmission duration $D_{CTL}$ in the case in which a hopping period is 2 (that is, the length of two subframes), and a hopping frequency interval is set in a minimum unit of RBs.

Referring to FIG. 11, if the RF tuning delay time $T_{RF\_Tuning}$ is longer than the control information transmission duration $D_{CTL}$ and the hopping period is 2, two successive subframes (for example, subframes n and n+1) included in a hopping period have the same frequency resources, and accordingly, the first subframe (subframe n) is allocated resources in the time domain by the same method as that described above with reference to FIG. 8.

However, since the second subframe (subframe n+1) which is the final subframe of the subframes configuring the hopping period and the first subframe (subframe n+2) included in the next hopping period have a frequency difference corresponding to the hopping frequency interval Δf, frequency conversion is needed in the first subframe (subframe n+2) of the next hopping period, and accordingly, an RF tuning delay time $T_{RF\_Tuning}$ has to be considered.

Accordingly, as illustrated in FIG. 11, MTC resources are allocated from a time point 1101 at which the data region B of the final subframe (subframe n+1) of subframes configuring a hopping period starts such that the MTC resources are allocated in the order of a MTC control information region C and a MTC data region D, the resources for MTC data are allocated up to a time point (or a region) that is earlier by the time difference $\Delta T_{RF\_Tuning}$ than the boundary 1103 of the corresponding subframe, and frequency conversion starts from the time point that is earlier by the time difference $\Delta T_{RF\_Tuning}$ than the boundary 1103 of the subframe.

While the example embodiments of the present invention and their advantages have been described in detail, it should be understood that various changes, substitutions and alterations may be made herein without departing from the scope of the invention.

What is claimed is:

1. A data transmission method for Machine Type Communication (MTC), which is performed by a communication apparatus supporting MTC, comprising:

dividing each of a plurality of subframes configured with time resources and frequency resources into a first control region for transmitting control information of a first communication and a first data region for transmitting data of the first communication according to a time axis; and allocating a second control region of a second communication and a second data region of the second communication in the first data region of each subframe according to a predetermined hopping period and a predetermined hopping frequency interval, wherein the second control region is allocated for transmitting control information of MTC and the second data region is allocated for transmitting data of MTC.

2. The data transmission method of claim 1, wherein the second control region and the second data region are configured with a frequency band that is narrower than the frequency band of each subframe and include a plurality of resource blocks, and the predetermined hopping frequency interval is decided as a frequency interval corresponding to a minimum number of resource blocks included in the frequency band for MTC.

3. The data transmission method of claim 1, wherein the center frequency of the second control region and the second data region allocated to the first data region of a predetermined subframe among the plurality of subframes is decided by a predetermined hopping frequency interval and a predetermined hopping index.

4. The data transmission method of claim 3, wherein the hopping index is an integer equal to or greater than 0, and the maximum value of the hopping index is decided by the number of resource blocks included in the plurality of subframes and the number of resource blocks allocated for MTC.

5. The data transmission method of claim 3, wherein the predetermined hopping period is decided based on at least one value of the index of the subframe and the maximum value of the hopping index.

6. The data transmission method of claim 1, wherein the allocating of the resources for MTC comprises allocating the resources for MTC to a time region corresponding to the second region of each subframe, in consideration of a time difference between a frequency conversion delay time of a receiving apparatus for receiving MTC data and the time duration of the corresponding first region.

7. The data transmission method of claim 6, wherein the allocating of the resources for MTC comprises allocating the resources for MTC to the same time duration as the second region if the frequency conversion delay time is equal to or shorter than the time duration of the first region.

8. The data transmission method of claim 6, wherein the allocating of the resources for MTC comprises allocating the resources for MTC from a time point elapsed by the time difference between the frequency conversion delay time and the time duration of the first region from a time point at which the second region of the subframe starts, if the frequency conversion delay time is longer than the time duration of the first region and the hopping period corresponds to the length of a subframe.

9. The data transmission method of claim 8, wherein the allocating of the resource for MTC comprises first allocating resources for data transmission among the resources for MTC in a time domain.

10. The data transmission method of claim 6, wherein the allocating of the resource for MTC comprises allocating the resources for MTC from a time point at which the second region of the subframe starts to a time point corresponding to the time difference between the frequency conversion delay time and the time duration of the first region, if the frequency conversion delay time is longer than the time duration of the first region and the hopping period corresponds to the length of a subframe.

11. The data transmission method of claim 10, wherein the allocating of the resource for MTC comprises first allocating resources for control information transmission among the resources for MTC in a time domain.

12. The data transmission method of claim 10, wherein in the allocating of the resource for MTC, the receiving apparatus for receiving the MTC data starts frequency conversion from a time point at which a region of the resources for MTC allocated to the second region of the subframe terminates.

13. A data transmission method for Machine Type Communication (MTC), which is performed by a communication apparatus supporting MTC, comprising:
dividing each of a plurality of subframes configured with time resources and frequency resources into a first control region for transmitting control information of a first communication and a first data region for transmitting data of the first communication according to a time axis; and
allocating a second control region of a second communication and a second data region of the second communication in the first data re ion of each subframe according to a predetermined hopping period and a predetermined hops inn frequency interval,
wherein the second control region is allocated for transmitting control information of MTC and the second data region is allocated for transmitting data of MTC,
wherein the center frequency of the second control region and the second data region allocated to the first data region of a predetermined subframe among the plurality of subframes is decided by a predetermined hopping frequency interval and a predetermined hopping index,
wherein the hopping index is shared by a transmitting apparatus and a receiving apparatus that perform MTC.

14. A data transmission method for Machine Type Communication (MTC), which is performed by a communication apparatus supporting MTC, comprising:
dividing each of a plurality of subframes configured with time resources and frequency resources into a first region for transmitting control information and a second region for transmitting data; and
allocating resources for MTC to the second region of each subframe according to a predetermined hopping period and a predetermined hopping frequency interval,
wherein the predetermined hopping period is decided as an integer multiple of the subframe.

15. A Machine Type Communication (MTC) apparatus comprises:
a digital-to-analog converter configured to convert a digital signal in a baseband frequency into an analog signal;
a frequency up-converter configured to up-convert the center frequency of the analog signal provided from the digital-to-analog converter according to a predetermined hopping frequency interval;
an amplifier configured to amplify a signal subjected to frequency up-conversion, provided from the frequency up-converter; and
a duplexer configured to provide the amplified signal provided from the amplifier to an antenna,
wherein each of a plurality of subframes in the amplified signal is divided with time resources and frequency resources into a first control region for transmitting control information of a first communication and a first data region for transmitting data of the first communication according to a time axis, and a second control region of a second communication and a second data region of the second communication are allocated in the first data region of each subframe according to a predetermined hopping period and a predetermined hopping frequency interval, wherein the second control region is allocated for transmitting control information of MTC and the second data region is allocated for transmitting data of MTC.

16. The MTC apparatus of claim 15, wherein the hopping frequency interval is set to a frequency interval corresponding to a minimum number of resource blocks included in a frequency band for MTC, and the frequency up-converter up-converts the center frequency according to the hoping frequency interval and a hopping index.

17. The MTC apparatus of claim 16, further comprising:
a low noise amplifier configured to amplify the signal provided from the duplexer;

a frequency down-converter configured to down-convert the center frequency of the signal provided from the low noise amplifier into a baseband frequency according to a predetermined hopping frequency interval; and
an analog-to-digital converter configured to convert the signal provided from the frequency down-converter into a digital signal.

* * * * *